(12) United States Patent
Zhang et al.

(10) Patent No.: US 9,096,302 B2
(45) Date of Patent: Aug. 4, 2015

(54) HYDROGEN REPLENISHED LIGHTER-THAN-AIR VEHICLE AND METHOD TO REPLENISH HYDROGEN

(75) Inventors: Boying B Zhang, Lawrenceville, NJ (US); Hong Zhang, North Brunswick, NJ (US); Louis D. Violante, Monroe Township, NJ (US)

(73) Assignee: Princetel Inc., Hamilton, NJ (US)

( * ) Notice: Subject to any disclaimer, the term of this patent is extended or adjusted under 35 U.S.C. 154(b) by 98 days.

(21) Appl. No.: 13/564,572

(22) Filed: Aug. 1, 2012

(65) Prior Publication Data

US 2013/0037654 A1   Feb. 14, 2013

Related U.S. Application Data

(60) Provisional application No. 61/521,435, filed on Aug. 9, 2011.

(51) Int. Cl.
*B64B 1/62* (2006.01)
(52) U.S. Cl.
CPC ........................................ *B64B 1/62* (2013.01)

(58) Field of Classification Search
CPC .............. B64B 1/58; B64B 1/60; B64B 1/62; B64B 1/64
USPC ........................ 244/30, 31, 61, 125, 127, 128
See application file for complete search history.

(56) References Cited

U.S. PATENT DOCUMENTS

| 2003/0207164 | A1* | 11/2003 | McElroy et al. | ................ | 429/26 |
| 2007/0138336 | A1* | 6/2007 | Palmer | ............................. | 244/30 |
| 2007/0278344 | A1* | 12/2007 | Zubrin et al. | ................... | 244/31 |

* cited by examiner

*Primary Examiner* — Nicholas McFall

(57) ABSTRACT

The present invention discloses a lighter-than-air vehicle and a method to replenish hydrogen into the vehicle while the vehicle is in the sky. The lighter-than-air vehicle can use helium or other gases that doesn't react with hydrogen as lifting gas. Hydrogen will be replenished into the lighter-than-air vehicle while it is still in mid-air. The lighter-than-air vehicles can comprise an aerostat, a hydrogen generator; a water tank and a duct. The present invention can also comprise an aerostat, a compartment, hydrogen generator, a water tank; and a duct. The present invention can also comprise an aerostat, a compartment, and a hydrogen storage alloy device. The present invention can also comprise an aerostat and a hydrogen storage alloy device.

3 Claims, 2 Drawing Sheets

HYDROGEN REPLENISHED LIGHTER-THAN-AIR VEHICLE AND METHOD TO REPLENISH HYDROGEN

CROSS REFERENCE TO RELATED APPLICATIONS

This application claims benefit to provisional application No. 61/521,435, filed on Aug. 9, 2011, which is incorporated by reference herein in its entirety.

FIELD OF INVENTION

The present invention relates generally to aerostats, and more particularly, to the lifting gasses of lighter-than-air vehicles, and a means of replenishing hydrogen into helium-filled lighter-than-air vehicles while the vehicle is still in the sky.

BACKGROUND

Lighter-than-air vehicles typically are constructed with inflatable fabric envelopes, filled with lighter-than-air lifting gasses. Such vehicles and can rise up to an altitude of 5,000 meters. Some of them are tethered to the ground by a cable, and many others are self-powered and can move on their own by some kind of propelling system. Lighter-than-air vehicles include aerostats free balloons, airships, and moored balloons. Lighter-than-air vehicles are lifted from the ground aerostatically rather than aerodynamically. They are widely used for telecommunications, radar systems, air traffic management, border control, environment protection and security. Tethered aerostats have the capability of providing continuous and non-interrupted service for 24 hours a day, 7 days a week under all kind of weather conditions.

Lifting gasses for lighter-than-air vehicles can be any gasses that are lighter than air. Hydrogen, helium, methane, ammonia and hot air are all capable of being used for aerostatic lift.

Helium is the most commonly used lifting gas for lighter-than-air vehicles. Helium is the second lightest element on earth. It is called noble gas because it is a colorless, odorless, tasteless, non-toxic, inert, monatomic gas. However, using helium as lifting gas for lighter-than-air vehicles has many drawbacks.

Helium gas leaks from aerostats easily due to its small molecular size. As a result, tethered aerostats need to be refilled periodically to stay up for services. Almost all of today's tethered aerostats have to be brought to the ground for helium replenishment. Therefore, the duration a tethered aerostat can remain airborne are limited by this necessity. Additionally, another concern using helium as lifting gas is that despite its abundance, the supply of helium may be dwindling. Helium is relatively rare element on earth—only 0.00052% by volume of earth's atmosphere.

Hydrogen was once a quite popular lifting gas used for lighter-than-air vehicles. Hydrogen is the first element in the periodic table. It is also the lightest and most abundant element on earth. However, hydrogen is highly flammable with the presence of oxygen that a small spark may cause a hydrogen explosion. Hydrogen was nevertheless widely used as lifting gas because it could be mass-produced through a variety of chemical processes at a low cost.

Methane and ammonia are other alternatives that can be used as lifting gas. Both methane and ammonia are chemical compounds containing atoms of one element bonded with hydrogen atoms. However, they have much less lifting power than either hydrogen or helium. Additional, methane has the drawback of being an explosive compound, and ammonia is dangerous for being toxic.

What is needed is a lighter-than-air vehicle that uses lifting gases that have helium's lifting ability and hydrogen's abundance in supply without the dangerous properties of each of the gases. What is also needed is a means of refilling lighter-than-air vehicle with the lifting gases without having the need to ground the lighter-than-air vehicle.

SUMMARY OF THE INVENTION

It is an aspect of the present invention is to provide means of replenishing hydrogen into the helium-filled lighter-than-air vehicles from the vehicle itself to allow it to maintain a long term, continuous mission without the needs to bring aerostat down to ground.

This aspect of the present invention can be obtained by a lighter-than-air vehicle comprising: an aerostat with a pressurized chamber filled with helium; a hydrogen generator; a water tank; a duct connecting the said hydrogen generator to the said water tank.

This aspect of the present invention can also be obtained by a lighter-than-air vehicle comprising: an aerostat with a pressurized chamber filled with helium; a compartment inside the said pressurized chamber; a hydrogen generator; a water tank; and a duct connecting said hydrogen generator to the said water tank.

This aspect of the present invention can also be obtained by a lighter-than-air vehicle with hydrogen replenishment comprising: an aerostat with a pressurized chamber filled with helium; a compartment inside said pressurized chamber surrounded by the said helium; and a hydrogen storage alloy device.

This aspect of the present invention can also be obtained by a lighter-than-air vehicle with hydrogen replenishment comprising: an aerostat with a pressurized chamber filled with helium; and a hydrogen storage alloy device.

BRIEF DESCRIPTION OF THE DRAWINGS

Further features and advantages of the present device, as well as the structure and operation of various embodiments of the present device, will become apparent and more readily appreciated from the following description or the preferred embodiments, taken in conjunction with the accompanying drawing of which.

DETAIL DESCRIPTION OF THE INVENTION

Figure 1:
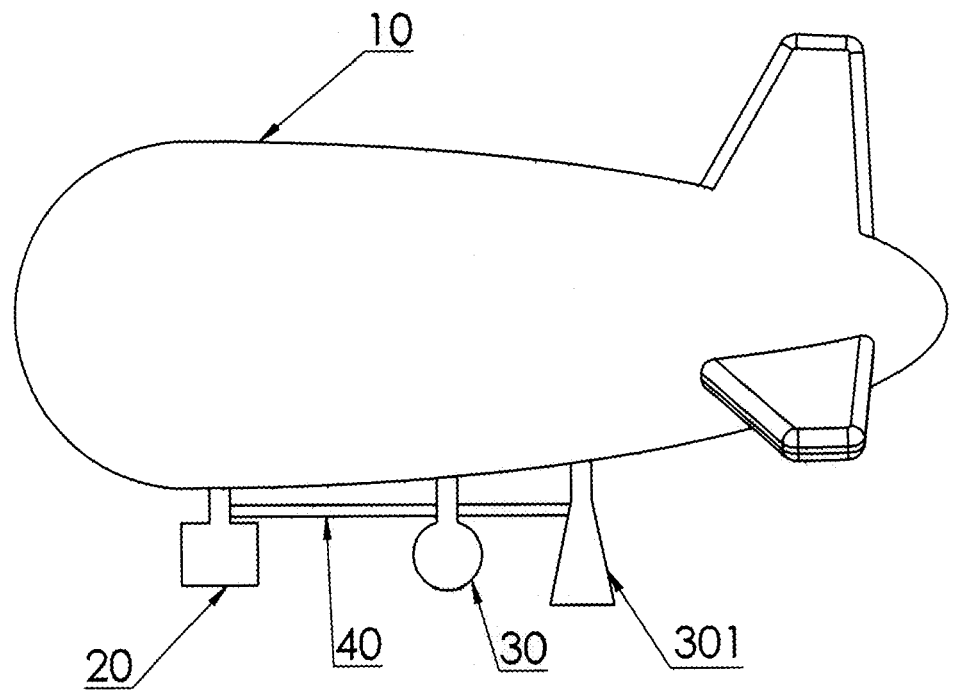
FIG. 1 is a schematic drawing of an embodiment of the hydrogen replenished lighter-than-air vehicle in the present invention comprising an aerostat with a pressurized chamber filled with helium, a hydrogen generator, a water tank, a duct connecting the said hydrogen generator to the said water tank.

This description of the exemplary embodiments is intended to be read in connection with the accompanying drawings, which are to be considered part of the entire written description. In the description, relative terms such as "lower," "upper," "horizontal,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

In FIG. 1, an embodiment of the lighter-than-air vehicle can comprise an aerostat 10 with a pressurized chamber filled with helium, a hydrogen generator 20, a water tank 30, a duct 40 connecting the said hydrogen generator to the said water tank. The aerostat 10 is filled with helium. The said hydrogen generator 20 is attached below the aerostat 10. The hydrogen generator 20 can further comprise a blower and control valve. The said water tank 30 is attached below the aerostat 10, and the water tank 30 can comprise an atmospheric water generator 301. There are two ways to provide water for the hydrogen generator 20. The first way is to store water in the water tank 30 as a payload before the aerostat 10 is lifted. Another way is to collect water from the ambient air by the atmospheric water generator 301, which is commercially available on the market. A duct 40 connects the water tank 30 to the hydrogen generator 20.

In this embodiment, when the pressure of helium gas inside the aerostat 10 is reduced to a certain level, a pressure sensor inside the aerostat 10 will trigger the signal to start the hydrogen generator 20, which in turn open the control valve to send a burst of hydrogen gas to replenish the helium filled aerostat 10 until the pressure sensor send a feedback signal to stop the hydrogen generator 20 and close the control valve.

When hydrogen is mixed with oxygen in proportion 2:1, or if the volumetric share of air in the mix exceeds 25%, the resulting gas can be explosive thus dangerous to use for a lighter-than-air vehicle. Helium is a noble gas which does not react with other element. Therefore, when helium and hydrogen are mixed together, the helium atoms will stable without reaction with the hydrogen atoms, and the hydrogen atoms will join to form $H_2$. As a result, the aerostats will be replenished with hydrogen extending the duration that the lighter-than-air vehicle will stay in the sky.

There are a variety of ways to produce hydrogen. One simple way to produce hydrogen is by the electrolysis of water. Electrolysis of water is the decomposition of water ($H_2O$) into oxygen ($O_2$) and hydrogen gas ($H_2$) due to an electric current being passed through the water. The hydrogen generator will draw water from the water tank 30 through the duct 40 and generate hydrogen gas through electrolysis. The resulting oxygen gas will be release into the surround environment. The resulting hydrogen gas will be used to replenish the aerostat 10.

Figure 2:
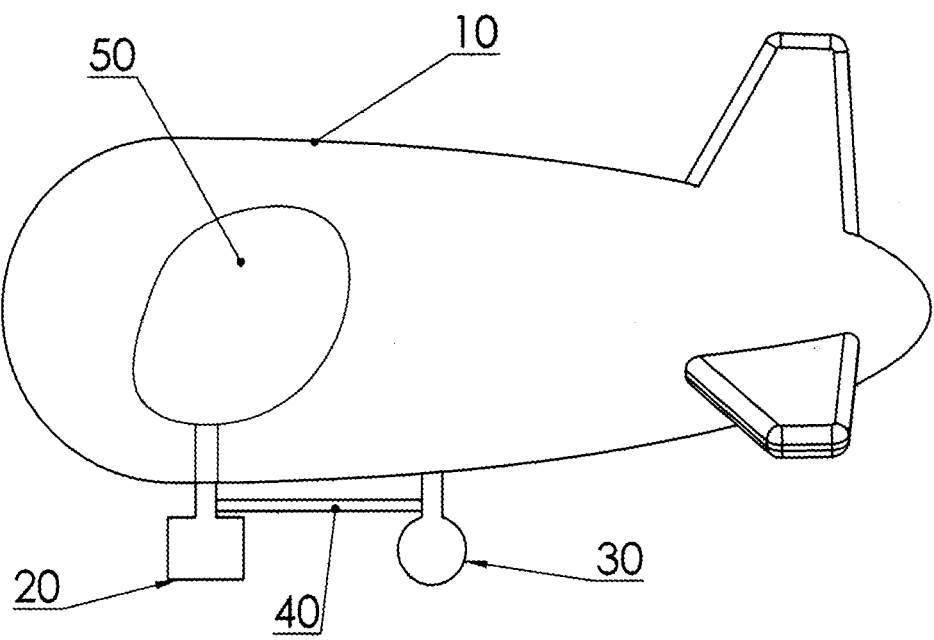
FIG. 2 is a schematic drawing of another embodiment of the hydrogen replenished lighter-than-air vehicle in the present invention comprising an aerostat with a pressurized chamber filled with helium, a compartment inside the said pressurized chamber, a hydrogen generator, a water tank, and a duct connecting said hydrogen generator to the said water tank.

In FIG. 2, an embodiment of the lighter-than-air vehicle can comprise an aerostat with a pressurized chamber filled with helium, a compartment inside the said pressurized chamber, a hydrogen generator, a water tank, and a duct connecting said hydrogen generator to the said water tank.

Instead of blending hydrogen with helium, as shown in FIG. 2, inside the aerostat 10 there is a compartment 50 filled with hydrogen. The helium surrounding the hydrogen-filled compartment 50 serves as a safeguard to prevent hydrogen from mixing with air in order to avoid possible hazards such as electrical discharge.

In this embodiment, when the pressure of helium gas inside the aerostat 10 is reduced to a certain level, a pressure sensor inside the aerostat 10 will trigger the signal to start the hydrogen generator 20, then open the control valve to send a burst of hydrogen gas to the compartment 50 until the pressure sensor send a feedback signal to stop the hydrogen generator 20 and close the control valve.

The helium gas is a preferred choice for the barrier gas because it achieves the double purposes of lifting of the lighter-than-air vehicles and serving as a non-reactive barrier gas. However, the barrier gas can also be any inert gas or even a non-reactive liquid as long as the additional weight of the barrier substance is offset by the increase in lifting power of the hydrogen.

The advantage of have a barrier surrounding the hydrogen-filled compartment is to reduce hydrogen explosion. Hydrogen is explosive when combined with oxygen. However, pure hydrogen gas burns out without an explosion when it comes in contact with a spark.

Figure 3:
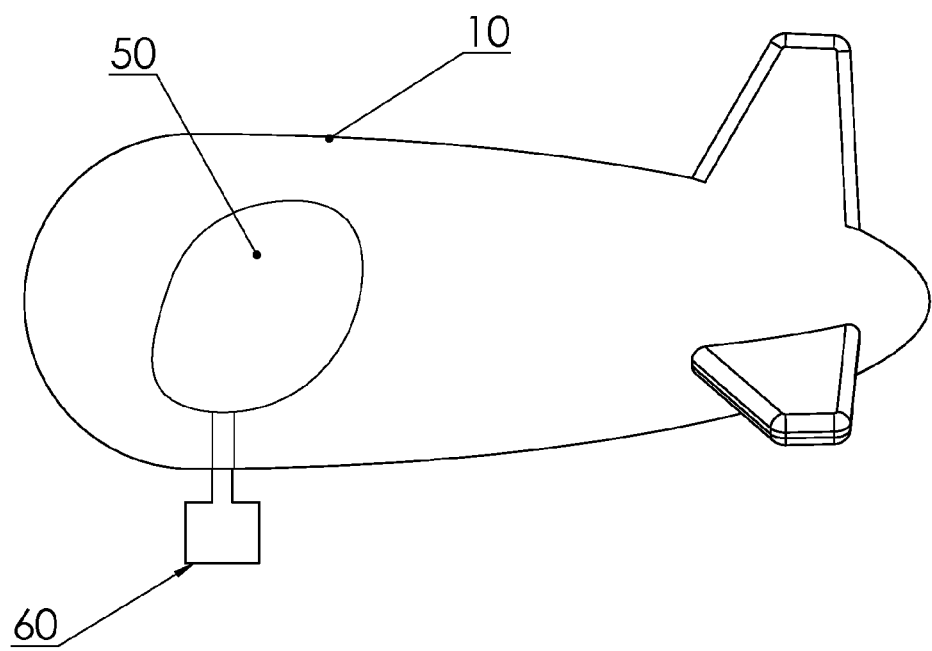
FIG. 3 is a schematic drawing of another embodiment of a hydrogen replenished lighter-than-air vehicle in the present invention comprising an aerostat with a pressurized chamber filled with helium, a compartment inside said pressurized chamber surrounded by the said helium and a hydrogen storage alloy device.

In FIG. 3, an embodiment of the lighter-than-air vehicle can comprise an aerostat with a pressurized chamber filled with helium, a compartment inside said pressurized chamber surrounded by the said helium and a hydrogen storage alloy device.

In fuel cell industry, one solution to storage hydrogen is to store the element in the form of hydride. This method utilizes an alloy that can absorb and hold large amounts of hydrogen by bonding with hydrogen and forming hydrides. A hydrogen storage alloy is capable of absorbing and releasing hydrogen.

This embodiment provides an alternative way to provide hydrogen to helium aerostat 10 by attaching hydrogen storage alloy device 60 to aerostat 10. When the pressure of helium gas inside the aerostat 10 shown in the figure is reduced to a certain level, a pressure sensor inside the aerostat 10 will trigger the signal to open the control valve to send a burst of hydrogen gas to a compartment 50 from hydrogen storage alloy device 60 until the pressure sensor send a feedback signal to stop the release hydrogen from hydrogen storage alloy device 60 and close the control valve.

What is claimed is:

1. A lighter-than-air vehicle comprising:
   an aerostat;
   at least one hydrogen generator;
   at least one water tank; and
   at least one duct;
   wherein said aerostat further comprises a pressurized chamber filled with helium and pressure sensors for monitoring the pressure in said pressurized chamber;
   wherein said hydrogen generator is attached to the aerostat, and further comprises a blower and a control valve for releasing the generated hydrogen to said pressurized chamber to maintain pressure in said pressurized chamber; and
   wherein the water tank is attached to the aerostat and connected to the hydrogen generator through the duct.

2. The lighter-than-air vehicles as recited in claim 1, wherein said water tank further comprises at least one atmosphere water generator to collect water from ambient atmosphere to be stored in the said water tank for use by said hydrogen generator.

3. The lighter-than-air vehicles as recited in claim 1, wherein said duct is a tube or a pipe.

\* \* \* \* \*